United States Patent
Biswas et al.

(10) Patent No.: US 9,619,481 B2
(45) Date of Patent: Apr. 11, 2017

(54) METHOD AND APPARATUS FOR GENERATING ORDERED USER EXPERT LISTS FOR A SHARED DIGITAL DOCUMENT

(71) Applicant: Adobe Systems Incorporated, San Jose, CA (US)

(72) Inventors: Sanjeev Kumar Biswas, Bangalore (IN); Prakhar Gupta, Aligarh (IN); Vaibhav Khandelwal, Jaipur (IN); Shweta Chahar, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 475 days.

(21) Appl. No.: 14/307,000

(22) Filed: Jun. 17, 2014

(65) Prior Publication Data

US 2015/0363405 A1  Dec. 17, 2015

(51) Int. Cl.
*G06F 17/30* (2006.01)

(52) U.S. Cl.
CPC .............. *G06F 17/30165* (2013.01)

(58) Field of Classification Search
None
See application file for complete search history.

(56) References Cited

U.S. PATENT DOCUMENTS

2010/0162135 A1* 6/2010 Wanas ............... G06Q 10/10
715/753
2010/0262659 A1* 10/2010 Christiansen ......... G06F 17/241
709/205

* cited by examiner

*Primary Examiner* — Anh Tai Tran
(74) *Attorney, Agent, or Firm* — Keller Jolley Preece

(57) ABSTRACT

A computer implemented method and apparatus for generating ordered user expert lists for a shared digital document. The method comprises accessing a digital document, wherein the digital document relates to one or more topics; generating a list of expert students, wherein the expert students have authored one or more annotations relating to a topic similar to a topic in the digital document; ordering the list of expert students according to a rank, wherein the rank identifies a level of expertise of the expert students; and presenting the ordered list of expert students, where the ordered list comprises a pre-defined number of expert students with a level of expertise meeting a predefined threshold.

20 Claims, 6 Drawing Sheets

METHOD AND APPARATUS FOR GENERATING ORDERED USER EXPERT LISTS FOR A SHARED DIGITAL DOCUMENT

BACKGROUND

Field of the Invention

Embodiments of the present invention generally relate to document sharing and, more particularly, to a method and apparatus for generating ordered user expert lists for a shared digital document.

Description of the Related Art

Online course-based learning platforms enable users to take classes online while being part of a global student community using e-readers, and social collaboration tools for sharing notes and providing highlights to their respective social networks. Documents for these online classes are shared with each student enrolled in the online class.

However, these online learning platforms fail to promote a sense of belonging that would develop from a traditional study group formed from a traditional classroom. Additionally, students using online learning platforms have difficulty in raising questions concerning the material they are learning and having the questions resolved quickly. Consequently, students may also find it difficult to establish informal learning groups where they would be able to converse with other students more knowledgeable in a particular subject about a given topic.

Therefore, there is a need for a method and apparatus for generating an ordered user expert list with a list of annotations from the best experts for a shared digital document.

SUMMARY

A method for generating ordered user expert lists for a shared digital document is described. The method accesses a digital document, wherein the digital document relates to one or more topics. The method generates a list of expert students, wherein the expert students have authored one or more annotations relating to a topic similar to a topic in the digital document. The list of expert students is ordered according to a rank, wherein the rank identifies a level of expertise of the expert students. The ordered list is presented, where the ordered list comprises a pre-defined number of expert students with a level of expertise meeting a predefined threshold.

In another embodiment, an apparatus for generating ordered user expert lists for a shared digital document is described. The apparatus includes a computer having one or more processors and further includes a user relevance module configured to generate a list of expert students for users who share a digital document relating to one or more topics, wherein the expert students have authored one or more annotations relating to a topic similar to a topic in the shared digital document, and order the list of expert students according to a rank, wherein the rank identifies a level of expertise of the expert students; and a document processing module configured to present the ordered list of expert students, where the ordered list comprises a pre-defined number of expert students with a level of expertise meeting a predefined threshold.

In yet another embodiment, a computer readable medium for storing computer instructions, that when executed performs the method for generating ordered user expert lists for a shared digital document.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
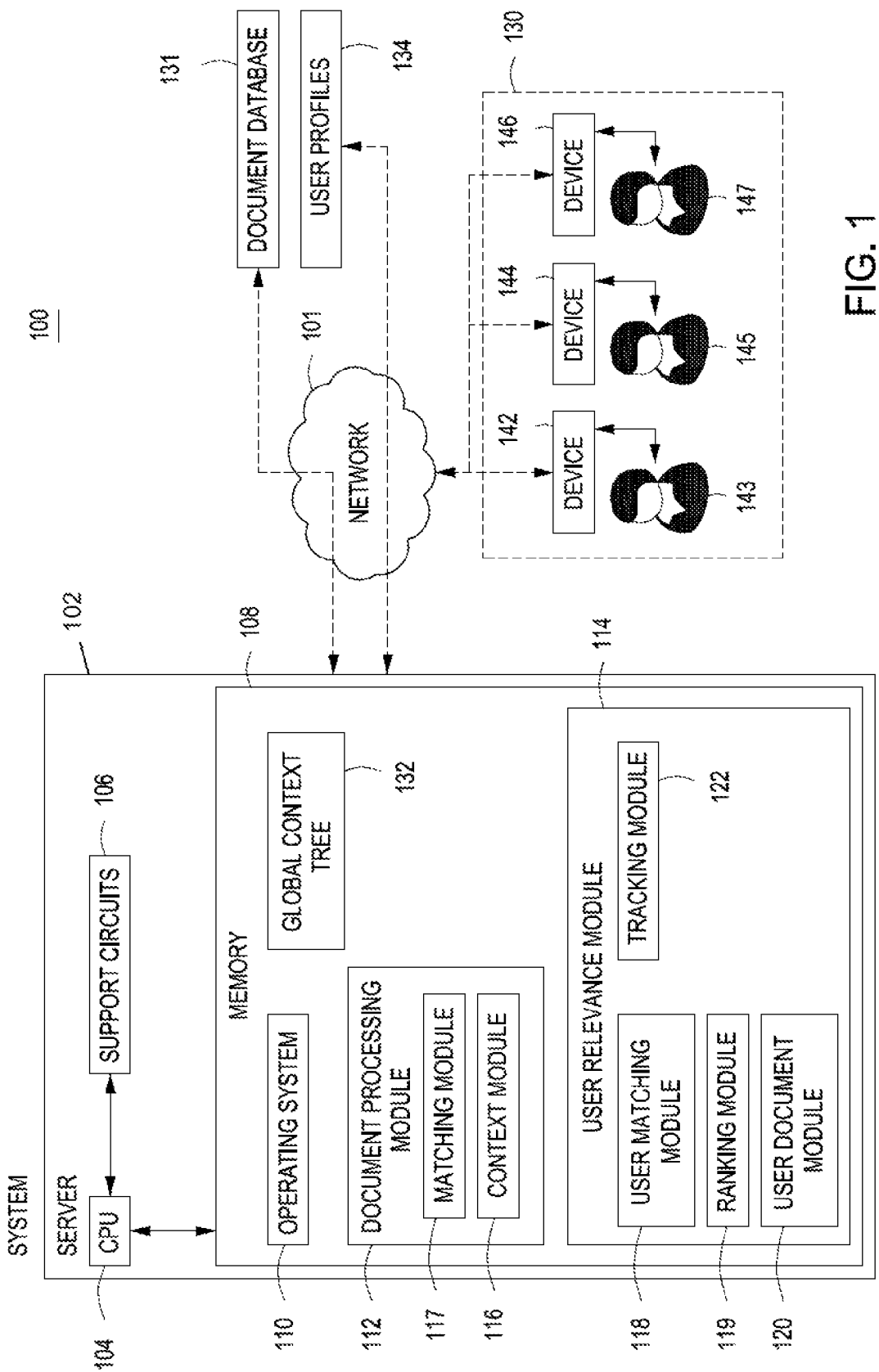
FIG. 1 is a block diagram of a system for generating ordered user expert lists for a shared digital document, according to one or more embodiments.

While the method and apparatus is described herein by way of example for several embodiments and illustrative drawings, those skilled in the art will recognize that the method and apparatus for generating ordered user expert lists for a shared digital document is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for generating ordered user expert lists for a shared digital document defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for generating ordered user expert lists for a shared digital document. In an online learning environment, such as ADOBE® Social Learning (ASL), when a user (e.g., a student) opens a digital document, the user is provided a list of "expert" students with whom the user may collaborate on a topic of the digital document. The user can browse the list of expert students and create a "class" of students or ask to be part of a class of students. Expert students are students who have experience with or a mastery of one or more topics in a course. For example, a user in an entry level software programming course may ask expert students who are taking an advanced level software programming course to be part of the class. The user can then collaborate with the expert students in the class. Annotations made by the expert students that are relevant to material in the digital document are made available to the user. The user may selectively import (download) annotations made by the expert students into the user's digital document. Additionally, the user can address questions to the expert students in the class.

After the user has read through the digital document and imported annotations related to the topic, the user takes a test, gauging the user's understanding of the topic. The user's test score is then distributed to the expert students whose annotations the user had imported. The score is applied as a measure of the ability of those expert students to author expert annotations relating to the topic being studied. In other words, the score is used to prioritize one expert student over another in terms of how good that expert student is as an annotation author. As the user views each page of a digital document, and for example, the topic of the material changes, other expert students in the class are presented to the user in an order prioritizing those who understand the material better than others based on the applied scores. As such, a user may select a class of expert students with whom to collaborate on a topic-by-topic basis.

Although the present disclosure refers to an on-line learning environment, the invention of the present disclosure may be used in any environment where documents are shared by a plurality of users.

Advantageously, the embodiments of the invention described herein, allow users of software applications such as ADOBE® eBook READER®, ACROBAT® READER®, ACROBAT® READER® Mobile, and the like, to have an improved experience when reading, annotating, and sharing digital documents.

Various embodiments of a method and apparatus for generating ordered user expert lists for a shared digital document are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for generating ordered user expert lists for a shared digital document, according to one or more embodiments. The system 100 includes a server 102. The computer system 100 is a computing device, for example, a desktop computer, laptop, tablet computer, and the like, acting as a server, operating over a wired or wireless network 101. The server 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 includes at least one of Read Only Memory (ROM), Random Access Memory (RAM), disk drive storage, optical storage, removable storage and/or the like.

The memory 108 includes an operating system 110, a document processing module 112, a user relevance module 114 and global context tree 132. The document processing module 112 further includes a context module 116 and a matching module 117. The user relevance module 114 further includes a user matching module 118, a user ranking module 119, a user document module 120, and a tracking module 122. The operating system 110 may include various commercially known operating systems. The server 102 is, according to one embodiment, a classroom server portion of an online user environment that communicates over a network 101 with a document database 131 and to retrieve user profiles 134. In an alternative embodiment, document database 131 and user profiles 134 are stored in memory 108 of the server 102.

A user 145, who is a student, accesses a document from the document database 131 via device 144. The context module 116 filters the documents in the document database 131 in order to identify documents similar to the document accessed by the user 145. Similar documents are documents in the document database 131 that cover similar topics or concepts. The user document module 120 computes a document confidence score for each of the similar documents based on the annotations made to both the document accessed by user 145 and the similar document. The user matching module 118 identifies other users who have made annotations to the similar documents. The expert students who made the annotations have a rank based on the quality of their annotations. The user matching module 118 provides the user 145 with a list of top ranked "expert" students with whom the user 145 may collaborate on a topic of the digital document. The user 145 can browse a set of "expert" students and create a "class" of students or ask to be part of a class of students. The user 145 selects one or more expert students from the list to be part of a class. The user can then collaborate with the expert students in the class. The user document module 120 presents annotations made by the expert students that are relevant to material in the digital document to the user. The user may selectively import (download) annotations made by the expert students into the user's digital document. Additionally, the user can address questions to the expert students the class using the device 144.

After the user has read through the digital document and imported annotations related to the topic, the user takes a test in order to gauge the user's understanding of the topic. The ranking module 119 distributes the user's score to the expert students whose annotations the user had imported. The score is applied as a measure of the ability of those expert students to author expert annotations relating to the topic being studied. In other words, the score is used to rank one expert student over another in terms of how good that expert student is as an annotation author. As the user views each page of a digital document, and for example, the topic of the material changes, other expert students in the class are presented to the user in an order prioritizing those who understand the material better than others based on the applied scores.

More specifically, users 130 access the server 102 via the network 101 to download digital documents and the like. Each user may be associated with a device that accesses the server 102 via the network 101. Using their device, a user accesses the digital documents for display and submits test scores and the like to the server 102. For example, a user 143 uses a device 142, a user 145 uses a device 144 and a user 147 uses device 146. Each of the devices 142, 144 and 146 include a display (not shown) for displaying the digital documents to the associated user, and an input device (such as a keyboard, not shown) for facilitating the associated user to input test score to the server 102.

Figure 2:
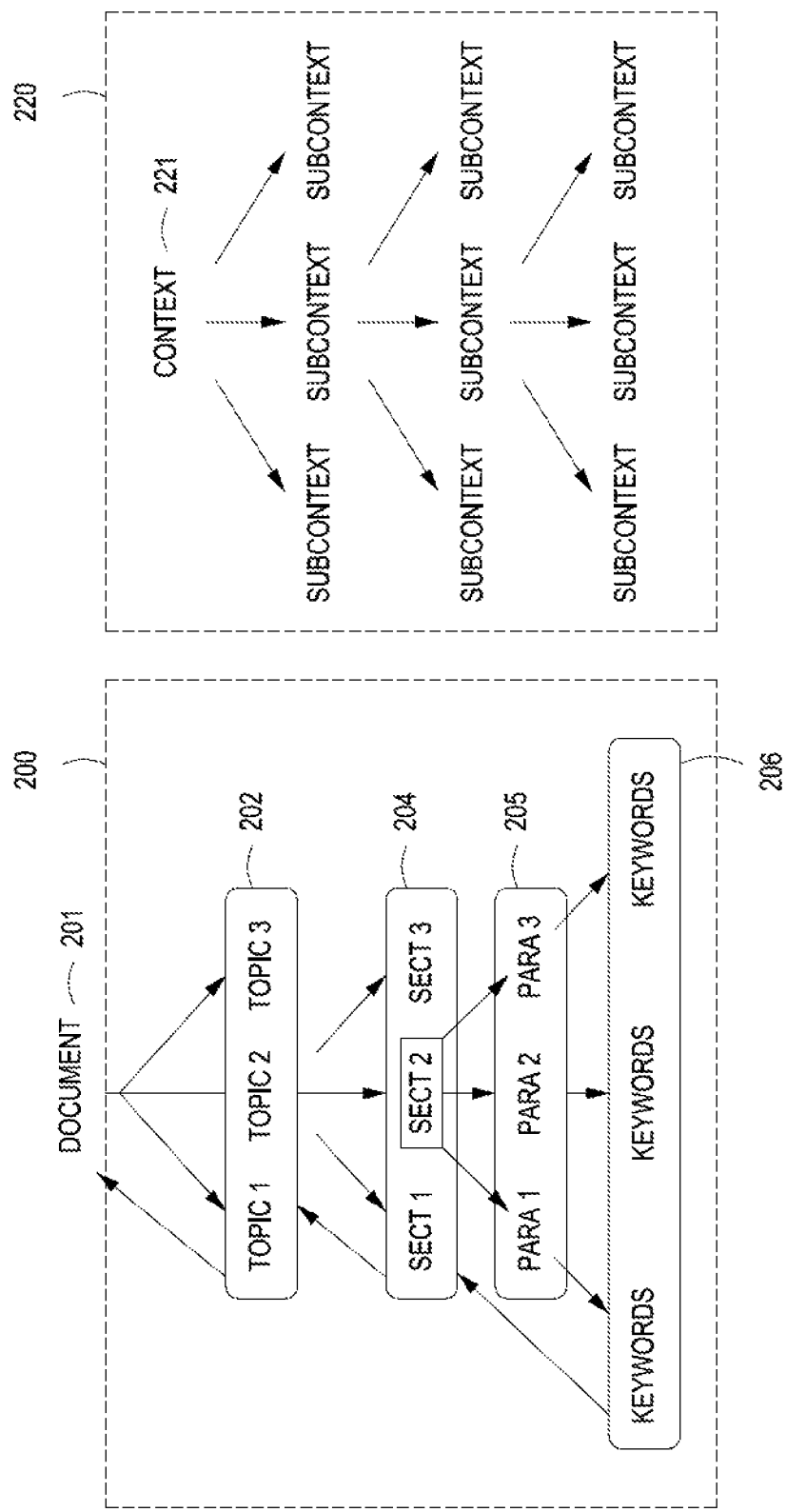
FIG. 2 illustrates a representation of a document context tree in accordance with exemplary embodiments of the present invention.

For each digital document, a document context tree (DCT) is created, as shown in FIG. 2 below. A global context tree (GCT) 132 is also created based on the sub-contexts derived from the DCTs of each document. Each node in the GCT 132 represents a top-level category and each child node represents a lower-level category. For example, "Algorithms" may be a top-level category node with a child node for "Graphs" (i.e., graph related algorithms). Each annotation created by expert students in a digital document is assigned to a node in the GCT 132.

The document processing module 112 processes a digital document uploaded to a documents database 131 associated with an online course. Each online course may include one or more digital documents that can be shared and collaborated with the users 130 who have subscribed to the course. Such users are also referred to herein as users of system 100 and as readers of digitally shared documents. Each document is stored in the document database 131, or similar storage either in memory 108 of server 102 or remotely. Annotations and highlights made to each document by the users are stored in global context tree (GCT) 132. Each annotation may include metadata such as student information, books read, document context tree and the like. For each student, each entry for an annotation in the GCT 132 has a corresponding pointer to the context in which the annotation was added, i.e., the document to which the annotation was added. Student profiles are stored as user profiles 134. The annotation includes a student's thoughts about the particular topic, a more detailed explanation of the topic, a mnemonic device, or anything that the student believes leads to a better understanding of the topic. The annotation may be textual, graphical, or the like.

Each annotation is assigned a note rank initially when all documents are processed by the document processing module 112. Each user is assigned a user rank initially, all students in user profiles 134 are assigned a same user rank. As each student opens a digital document for reading, the document processing module 112 forms a document context tree (DCT) using the context module 116 from the uploaded document. As described in detail later on with respect to FIG. 2, a document context tree is in the form of a tree structure 200 that includes one or more top level topics 1 . . . N. Each topic is a subject of the digital document. Each topic may include one or more sections. The one or more sections are referred to as children of a topic. Each of the one or more sections may include one or more paragraphs of text. The one or more paragraphs are referred to as children of a section. The paragraphs of text include keywords which are used to determine a page context description for the uploaded document. As the context module 116 parses the document, the context module 116 creates nodes for the document context tree (DCT) representing topics, sections, paragraphs and keywords.

When a user 145 accesses a document from the document database 131, the matching module 117 filters the document database 131 for documents that have been processed by the context module 116 that are similar to the document accessed by the user 145. In some embodiments, a similar document includes the same document. According to one embodiment, similarity may be determined using ontology matching (i.e., matching a description of the concepts or topics). The DCT of a digital document is matched to a GCT node in order to retrieve the annotations associated with that node. In a given digital document, a user is on a particular page and the page is associated with a list of keywords based on the paragraphs of the page. The GCT is searched for these keywords individually. Once a matching GCT node is found, the annotations associated with the node are retrieved. For example, a document includes a keyword "HTML". The GCT is searched for the node identified by the keyword "HTML". All annotations that were made regarding the word "HTML" by all users to any documents in the document database 131 are retrieved.

Once all the documents are processed by the document processing module 112, all users and their annotations have the same "rank" value, and therefore do not have any relative ordering between them. In other words, each user is assumed to know the same about each topic as all other students. Now, a particular user who is reading a document (the user being referred to as a "reader") selects appropriate expert students for his or her "class"—i.e., an informal group of students created as a study group or an interest group. The reader may look at annotations that the expert students in their class have made and import those annotations which are appropriate for the document he or she is reading. As users import annotations authored by an expert student, that expert student whose annotations are imported likely has an increase in their rank. According to some embodiments, where no expert students have relevant annotations, a reader may import annotations from users outside of the class and shown to the reader. In other embodiments, a "class" of users is constructed by finding users who match what the reader is reading using the user matching module 118.

Initially, each annotation and user has no rank. Accordingly, a list of unsorted users is displayed for the reader. The tracking module 122 tracks the previously discussed import action and uses the list of unsorted expert students to rank the annotation as well as the expert student who made the annotation. As all users using the online course platform create annotations on topics and context descriptions in digital documents, the tracking module 122 tracks these actions. The tracking module 122 tracks other activity also, such as test-taking activity by the users of the online course platform. Subsequently, the user document module 120 computes an effective note rank for all imported annotations. Each note rank affects the final user rank, which is computed by the ranking module 119. For example, if a user takes a test in order to test their strength of understanding of a particular topic (e.g., sorting algorithms), and the user has imported, for example, 20 annotations of other users, the test score of that test taking user is equally distributed among each annotation imported by the test taking user, so as to affect the rank of each author of each imported annotation. If, for example, the user scores a 2 out of 10 on the test and has imported twenty annotations from a particular user ("Expert 1"), "0.2" points are distributed equally among the 20 annotations. Consequently, the rank of Expert 1, the author of those 20 annotations, does not increase significantly. However, if a user scores 9 out of 10 on the test and has imported two annotations from another user ("Expert 2"), 0.9 is distributed between those two annotations, dramatically increasing the user ranking of Expert 2, the author of those two annotations. The distributed score from the test constitutes the confidence score of each annotation, that is, a "Document Confidence Score". By increasing an annotation's rank, the rank of the expert student who authored the annotation also increases, and vice versa.

After the document confidence scores have been computed for the annotations by the user document module 120 and users ranks based on the current page being read by a reader have been computed by the ranking module 119, the list of expert students displayed for the reader is sorted based on the computed user rank and computed note rank. In exemplary embodiments, the user document module 120 computes a document confidence score for all similar documents, i.e., annotations that pertain to both documents. In exemplary embodiments, the ranking module 119 computes a local user rank for all of the expert students in the class, according to the following formula which computes as the local user rank an average of the document confidence scores for all of the matched documents:

$$\text{Local user rank} = \left[ \sum_{\text{for all matched documents}} \text{Document Confidence Score} \right] \div \text{Number of Matched documents}$$

As the reader reads the digital document (e.g., transitions to a new page or a new topic), the list of expert students and annotations is re-ordered after the most appropriate annotations are found for that particular page. Once all annotations are found from the GCT for a given set of keywords of a particular page (i.e., a DCT sub-graph) and they do belong to the set of students in the user's class, the annotations are sorted based on their individual ranks (highest to lowest). In some instances, the user may receive no annotation suggesting that the expert students have not added annotations for the particular page/subject. In such case, annotations are then fetched from the GCT. Accordingly, the reader is provided an ordered list of expert students in a particular context of keywords found on that particular page, based on their annotation and user rank. The user may select from the ordered list of expert students to select people to whom they can address questions, raise doubts and concerns, and generally collaborate with to gain a better understanding of the subject of study.

FIG. 2 depicts a representation of a document context tree (DCT) 200 in accordance with exemplary embodiments of the present invention. When a digital document 201 is imported into server 102, the context module 116 generates a DCT 200 from the document 201. The context module 116 generates the DCT 200 using the inherent structure of the document 201 to store information associated with the document 201. Metadata associated with the document 201 identifies the structure of the document 201 by identifying a hierarchy of topics, sections within each topic, and paragraphs within each section. The DCT 200 is a data structure that simulates a hierarchical tree structure with a collection of nodes, starting at a root node. Each node is a data structure consisting of a value, together with a list of references to nodes, with the constraints that no reference is duplicated. In some embodiments, an identifier of the document 201 is used as the root node. The context module 116 generates a child node for each identified topic 202. Each child node for an identified topic 202 is a child of the root node. For each topic 202, the context module generates a child node for each section 204 within the topic 202. The context module 116 generates a child node for each paragraph 205 of each section 204. The context module 116 employs a keyword extractor to extract keywords 206 from each paragraph 205. The context module 116 generates a child node for each keyword 206 from each paragraph 205. In some embodiments, a DCT 200 is maintained for each page of the document 201.

The DCT 200 includes one or more topics 202, one or more sections 204; each section including one or more paragraphs 205. Each paragraph 205 includes one or more keywords 206. The DCT 200 separates each topic, such as topic 1, topic 2 and topic 3 into various sections. For example, topic 2 may contain sections one, two and three. Section two may further contain several paragraphs about the particular sub-topic, e.g., paragraph one, paragraph two and paragraph three as shown in FIG. 2A. In the DCT 200, the root of the DCT 200 may be the title of the document 201, and the chapters may be separated into topics 202 (i.e. child nodes). Each chapter may have several sections, separated into sections 204 (child nodes of each topic). Child nodes for each paragraph are assigned to each section. The context for a particular portion of text in a digital document is identified by keywords and topics. The keywords of a section are a union of keywords of its paragraphs. The keywords of a topic are a union of keywords of its sections. For example, if one of the keywords is "saw": if the keyword "saw" was a child node under a node called "tools" this would indicate one possible context for the keyword "saw", as compared to the word "saw" as a child node under a node called "verbs-past tense", which indicates that in this context "saw" is about a part of speech.

Each digital document that is associated with a course has a DCT generated by the context module 116. All DCTs are then passed onto the global context tree (GCT) 220 allowing the server 102 to store information according to context of each child node in the DCT 200. The GCT is searched for each keyword 206 in the DCT 200. For each keyword 206, if the keyword 206 does not have a corresponding node in the GCT, a node is generated for the keyword 206 in the GCT. A pointer back to the keyword node in the DCT 200 is added to the keyword node in the GCT. Hence, a search for a keyword 206 in the GCT returns information that identifies one or more documents 201 in which the keyword 206 is found. In addition, annotations made in reference to the keyword 206 are stored in the GCT. Specifically, an annotation identifier, text of the annotation, a document identifier, a user identifier, and a rank are stored in the GCT.

The context module 116 assigns weights for each keyword in the DCT. When a user searches for annotations, the GCT is searched to retrieve matching annotations. The matched annotations are ranked according to similarity with the context the user is annotating, and the annotations are presented sorted according to similarity rank. When a student makes an annotation to a particular paragraph of a book, the annotation is attached (i.e., annotated) to the particular paragraph's context.

An example illustration of a GCT 220 is shown in FIG. 2. The context 221 contains one or more child nodes of sub-context. Each sub-context node contains one or more sub-contexts itself, and so on.

In one embodiment, annotations (for example, notes related to a document by "appropriate" keywords, as determined by weights assigned to the context of the keywords in the DCT 200) are ranked based on tests taken by students who downloaded those annotations. Each test taking student is given a test score based on their performance. If the test taking student scores well (e.g., score above a certain threshold percentage), the students who authored the downloaded annotations are ranked higher "experts" than other student authors. When a reader of a digital document asks for a ranking of experts based on, for example, a keyword in a document, the reader sees the experts for that keyword, in that context, ranked according to their level of expertise. Their level of expertise is determined according to their ability to author annotations helpful to other students who, after downloading and reading them, score well on tests related to that subject.

Figure 3:
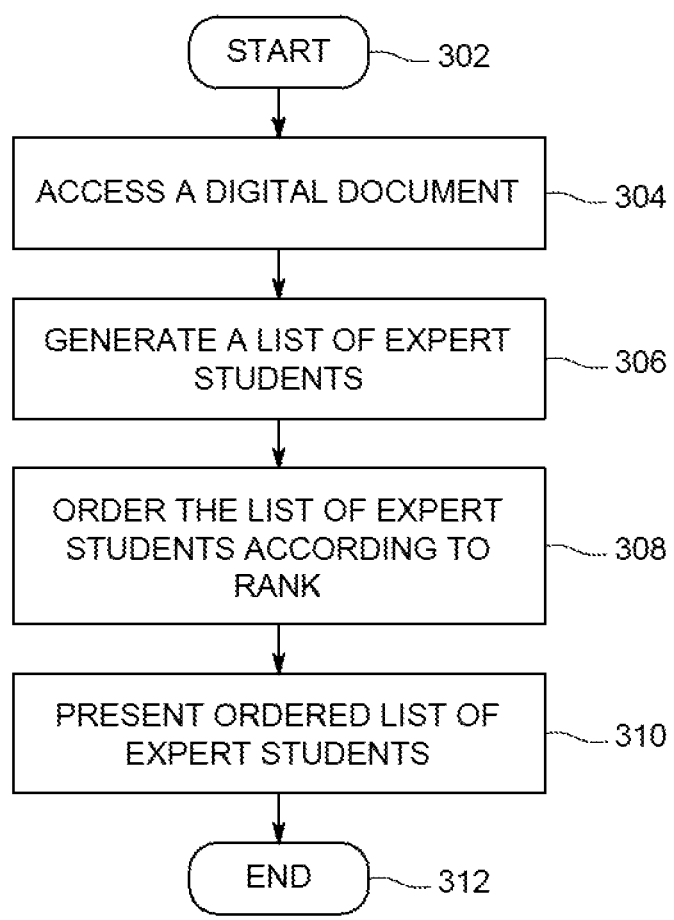
FIG. 3 depicts a flow diagram of a method for generating ordered user expert lists for a shared digital document as performed by the user ranking module of FIG. 1, according to one or more embodiments.

FIG. 3 depicts a flow diagram of a method 300 for generating ordered user expert lists for a shared digital document as performed by the document processing module 112 and the user relevance module 114 of FIG. 1, according to one or more embodiments. A user accesses a digital document in an online learning environment. The user may be a student who wishes to collaborate with "expert" students who have a mastery of the concepts included in the digital document. The expert students may have made annotations to the digital document when the expert students accessed the digital document previously. The expert students may have made annotations to other digital documents that relate to a same or similar topic as contained in the digital document accessed by the user. The expert students are ranked based on the quality of their annotations. The method 300 identifies a list of top ranked expert students with whom the user may collaborate. The method begins at step 302 and proceeds to step 304.

At step 304, the method 300 accesses a digital document. The digital document is a document used in an on-line learning environment for an on-line course. The document may be accessed from a database of digital documents related to the on-line course, other on-line courses, or topics discussed in the on-line courses. The document discusses one or more topics related to the on-line course.

The method 300 proceeds to step 306, where the method 300 generates a list of expert students who have authored annotations related to a topic similar to a topic in the digital document. Expert students are determined from a plurality of all users who have annotated digital documents. The method 300 performs filtering, or extracting, of similar documents using ontology matching to produce a set of filtered documents ("D"). For example, an online course on sorting algorithms is associated with several required and/or optional digital documents, in addition to digital tests. Some of the digital documents pertain to the known Quicksort sorting algorithm (sometimes called a partition-exchange sorting algorithm), and some other digital documents pertain to the known Bubblesort sorting algorithm, both algorithms useful for sorting an unordered list of items. Those documents relating to Quicksort are deemed to be "similar" based on ontology matching and are included in set D. The method 300 performs filtering, or extracting, of users ("U") who have read documents from set D. For example, each digital document related to the Quicksort algorithm has a set of users U who have read the Quicksort documents.

The method 300 computes a document confidence score for each user in the set U. According to one embodiment, the document confidence score is determined by digital tests taken by each user in the set of users U. For example, if a user scored a 2 out of 10 on a test relating to the Quicksort algorithm, 0.2 points gets distributed to each digital document from document set D that the user imported annotations from, and to the authors of the annotations. The annotation rank and the author's rank increase by 0.2 points. If a user scored higher, such as a 9/10, the annotation rank would increase by 0.9 and, accordingly, the author of the annotation has their rank increased by 0.9 also.

The method 300 evaluates the local user rank of each user in set U in accordance with the formula noted above performed by the ranking module 119. For example, for a user A who has a document confidence score of 0.45 for document A, 0.5 for document B and 0.1 for document C (where A, B and C are the only documents in set D), the local user rank can be computed as: (0.45+0.5+0.1)/3. Therefore, the user's local rank would be 0.35. User's that have a rank above a predefined threshold are determined to be expert students.

The method 300 proceeds to step 308, where the method 300 orders the list of determined expert students according to rank. The method 300 sorts the list of expert students based on the computed local user rank. An expert student with a local user rank of 0.35 is sorted higher than an expert student with a local user rank of 0.1.

The method 300 proceeds to step 310, where the method 300 presents the sorted list of expert students. The user is then able to select expert students in order to create a class after viewing each user's profile. In some embodiments, where a DCT is generated for each page of a document, the method 300 is repeated each time a user navigates to a next page of the document. In such embodiment, the list of expert students is refreshed each time the user navigates to the next page of the document. The method 300 proceeds to step 312 and ends.

Figure 4:
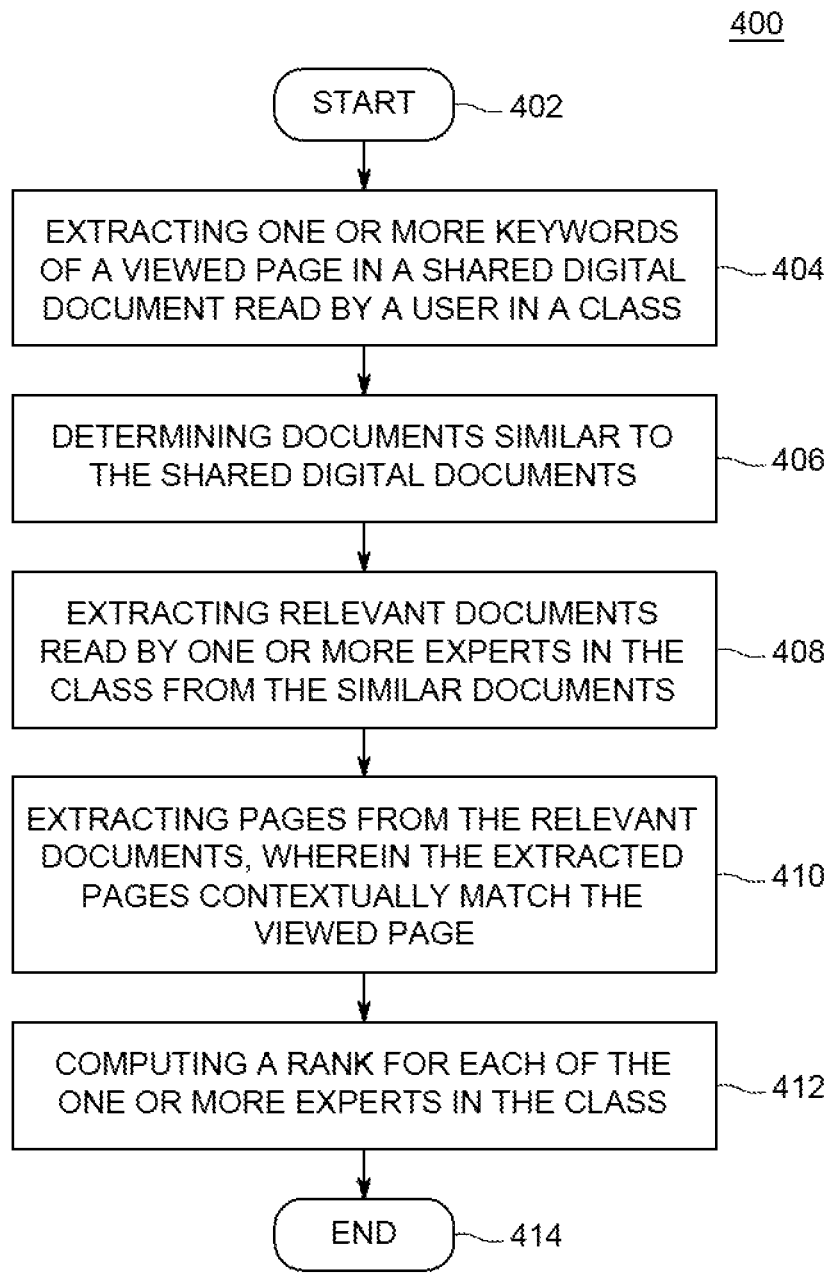
FIG. 4 depicts a flow diagram of a method for computing user rank, according to one or more embodiments.

FIG. 4 depicts a flow diagram of a method 400 for computing user rank as performed by the document processing module 112 of FIG. 1, according to one or more embodiments. The method begins at step 402 and proceeds to step 404.

At step 404, the method 400 extracts one or more keywords of a viewed page in a shared digital document read by a student/user in a class to form a DCT.

The method 400 proceeds to step 406, where the method 400 determines a set of documents similar to the shared digital documents (which may have previously been determined in step 304 in method 300). For example, if the shared digital document being read by a student is related to the Quicksort algorithm, other digital documents relating to Quicksort are determined to be similar to the shared digital document.

The method 400 proceeds to step 408, where from the similar documents, the method 400 extracts a set of relevant documents which have been read by the experts in the class. For example, if experts have read three documents from set D (from method 300), these three documents are determined to be relevant. Experts reading particular documents indicate this relevancy.

The method 400 proceeds to step 410, where the method 400 extracts pages from the relevant documents, wherein the extracted pages contextually match the viewed page. According to exemplary embodiments, a keyword match is performed between the one or more keywords and a set of keywords representing the page of the document stored as a DCT. E.g., the keywords "Quicksort", "sorting", "partition", "exchange" or the like may all be used to match between each document. Each extracted page has a page relevance which represents how closely the page matched with the viewed page based on the matching keywords. Relevancy is determined by matching keywords in a page of a digital document being read against a GCT. The keywords are compared to each node in the GCT. When a match is found, the annotations associated with the node are considered relevant.

The method 400 proceeds to step 412, where the method 400 computes the rank of each expert in the class according to the following formula:

$$\text{Rank of User } i = \Sigma_{\text{document read by user in the relevant documents}} \text{document relevance} * \Sigma_{\text{for each note by expert}} (\text{PageRelevance} * \text{noteValue}) \quad \text{(Eq. 2)}$$

Where the "noteValue" is computed according to the following equation:

$$\text{noteValue}(i) = k \, \Sigma_{j=1}^{n} \text{ test score}(j) * (\text{notes\_imported}(i) / \text{total\_notes\_imported}(j)) \quad \text{(Eq. 3)}$$

The noteValue is used to distribute the test score equally among the imported notes. In Equation 3, "i" is the user whose rank is being computed and user "j" is the user who imported the annotation of user "i"; k is a constant value.

The method 400 proceeds to step 414 and ends.

Figure 5:
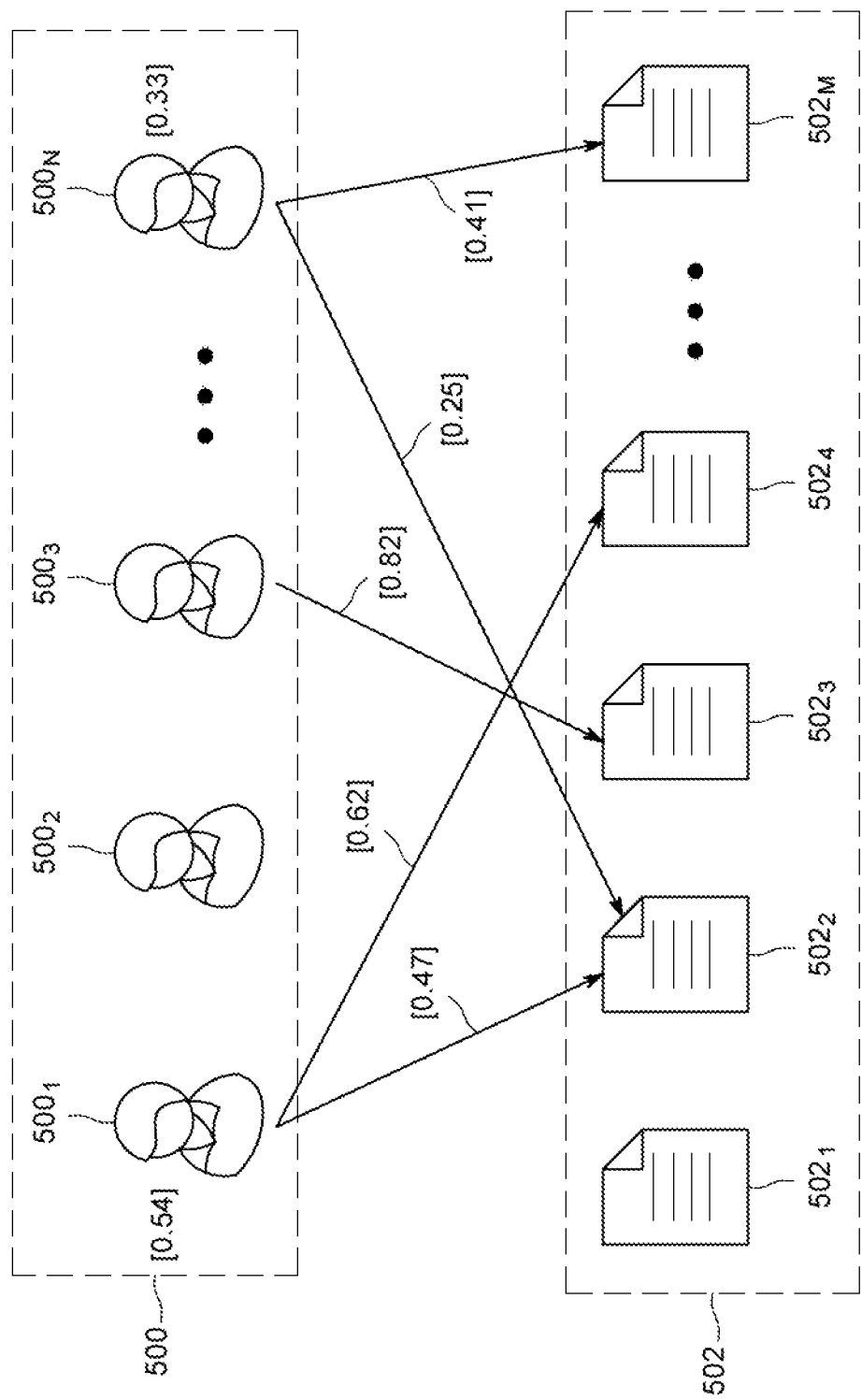
FIG. 5 illustrates an ordered list of users in relation to a set of documents, according to one or more embodiments.

FIG. 5 illustrates an ordered list of users in relation to a set of documents, according to one or more embodiments of the present invention. Users 500 of the present system include users $500_1$ to $500_N$. Documents 502 are stored in the document database 131 and include document $502_1$ to $502_M$. Each user in users 500 has read one or more documents from documents 502. For all the read documents, the user has an associated confidence score, shown as arrows from the user to the document. This score is used to compute the local rank of the user. The user is then sorted based on this rank. For example, user $500_1$ has a confidence score of 0.47 with document $502_2$ and a confidence score of 0.62 with document $502_4$. User $500_3$ has a confidence score of 0.82 for document $502_3$. Similarly, user $500_N$ has a confidence score of 0.25 for document $502_2$ and a confidence score of 0.41 for document $502_M$. Accordingly, local user rank is computed as 0.54 for user $500_1$ and 0.33 for user $500_N$, and the list of users is shown in sorted order of user rank, for example, from left to right.

Figure 6:
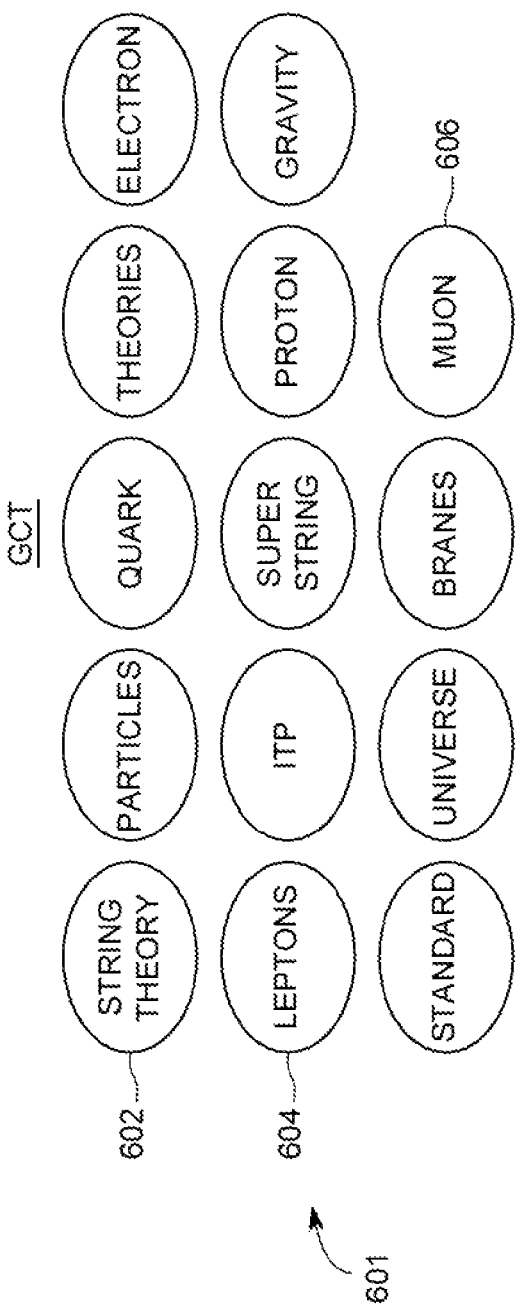
FIG. 6 illustrates a methodology configured in accordance with an embodiment of the present invention.
Figure 6:
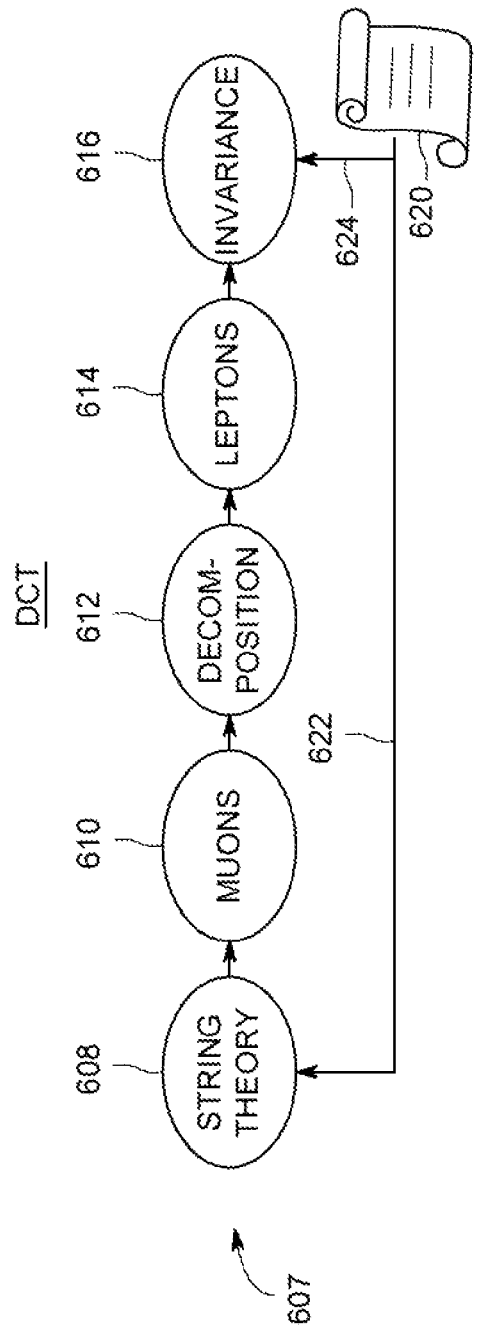

FIG. 6 illustrates a methodology configured in accordance with an embodiment of the present invention. A global context tree (GCT) 601 includes nodes for keywords from previously read documents. A document context tree (DCT) 607 is created for a current page of a document. The GCT 601 includes a plurality of nodes 602, 604, 606 that correspond to keywords in one or more previously read documents.

When a user reads a current page of a document, the document context tree (DCT) 607 is generated for the current page of the document. The DCT 607 for a page may include a single node or a plurality of nodes. The DCT 607 for the current page includes a start node 608 for the current page and an end node 616 for the current page. The start node 608 and the end node 616 denote an ontology hierarchy (i.e., hierarchy of keywords) for the page. The page of the document relates to string theory and discusses muons, decomposition, leptons and invariance. Hence, nodes 608, 610, 612, 614, and 616 are generated for the extracted keywords.

When the user annotates the page, annotation 620 is stored. A database entry is created that includes annotation text, a pointer 622 to the start node 608 and a pointer 624 to the end node 616, a pointer to an identifier of the document from which the page is read, and a pointer to a user identifier of the user. The annotation includes a rank, which is initialized to zero.

The keyword of each node of the DCT 607 is compared to a keyword of each node of the GCT. Three nodes are found to have matching keywords. Node 608 matches node 602. Node 610 matches node 606, and node 614 matches node 604. A matching node means that annotations were made by users that relate to the matching keywords and those annotations are stored in the GCT 601.

From each matching node 602, 604, 606, an annotation identifier is extracted and stored in a list. The annotation identifiers in the list are sorted based on their rank. A user identifier for each user who authored each annotation is identified. The list of user identifiers is stored in a same order as the annotations are sorted. User identifiers of the highest ranked users from the list are displayed for selection in a class.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the non-transient computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java RTM, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
    accessing a digital document, wherein the digital document relates to one or more topics;
    generating a list of expert students, wherein the expert students have authored one or more annotations relating to a topic similar to the one or more topics in the digital document by:
        extracting similar documents from a database of digital documents;
        filtering the similar documents into a set of documents that one or more users have annotated;
        computing a confidence score for each annotation imported by a user; and
        computing a local user rank of each expert student based on the confidence score;
    ordering the list of expert students according to the local user rank, wherein the local user rank identifies a level of expertise of the expert students; and
    presenting the ordered list of expert students, where the ordered list comprises a pre-defined number of expert students with a level of expertise meeting a predefined threshold.

2. The method of claim 1, further comprising:
    regenerating the ordered list of expert students as a new topic in the digital document is viewed, wherein the ordered list is based on an identified context of the new topic.

3. The method of claim 1, wherein ordering the list of expert students according to the local user rank comprises:
    determining a first digital document read by a first expert student and a second digital document read by a second expert student;
    determining a first measure of similarity of the first digital document relative to the digital document and a second measure of similarity of the second digital document relative to the digital document; and
    ordering the list of expert students based on the first measure of similarity of the first digital document and the second measure of similarity of the second digital document.

4. The method of claim 1, further comprising:
    wherein computing the confidence score for each annotation comprises computing a confidence score for each annotation imported by the user accessing the digital document, wherein the confidence score is based on a test score of one or more users who imported the annotation, the test score an indication of a quality of the annotation.

5. The method of claim 1, further comprising:
    extracting one or more keywords of the digital document;
    determining the similar documents based on presence of the keywords in the similar documents, wherein the similar documents also comprise one or more digital documents;
    extracting pages of relevant documents from the similar documents, the relevant documents being those documents annotated by one or more of the expert students, wherein context of the extracted pages is similar to context of a page in the digital document; and
    ordering the list of expert students by also taking into account a measure of a similarity of the extracted pages when computing the local user rank.

6. The method of claim 5, further comprising:
    calculating a test score for a test taking user based on a test taken for a particular topic;
    computing the confidence score for each annotation by distributing the test score among each annotation imported by the test taking user; and
    changing the local user rank of the expert student who authored each annotation based at least in part on the confidence score.

7. The method of claim 6, wherein the confidence score for each annotation increases as users who import the annotation, score higher on tests than previous users who imported the annotation.

8. A computer implemented method comprising:
accessing a digital document, wherein the digital document relates to one or more topics;
generating a list of expert students, wherein the expert students have authored one or more annotations relating to a topic similar to the one or more topics in the digital document;
computing a confidence score for each annotation imported by a user accessing the digital document, wherein the confidence score is based on a test score of one or more users who imported the annotation, the test score being an indication of a quality of the annotation;
computing a rank based on the confidence score for each annotation by the one or more users relating to the similar topic; and
ordering the list of expert students according to the rank, wherein the rank identifies a level of expertise of the expert students; and
presenting the ordered list of expert students, where the ordered list comprises a pre-defined number of expert students with a level of expertise meeting a predefined threshold.

9. The method of claim 8, further comprising regenerating the ordered list of expert students as a new topic in the digital document is viewed, wherein the ordered list is based on an identified context of the new topic.

10. The method of claim 8, wherein:
generating the list of expert students comprises:
extracting similar documents from a database of digital documents; and
filtering the similar documents into a set of documents that one or more users have annotated.

11. The method of claim 8, wherein ordering the list of expert students according to the rank comprises:
determining a first digital document read by a first expert student and a second digital document read by a second expert student;
determining a first relevance of the first digital document relative to the digital document and a second relevance of the second digital document relative to the digital document; and
ordering the list of expert students based on the first relevance of the first digital document and the second relevance of the second digital document.

12. The method of claim 8, further comprising:
extracting one or more keywords of the digital document;
determining similar documents to the digital document based on presence of the keywords in the similar documents, wherein the similar documents also comprise one or more digital documents;
extracting pages of relevant documents from the similar documents, the relevant documents being those documents annotated by one or more of the expert students, wherein context of the extracted pages is similar to context of a page in the digital document; and
ordering the list of expert students by also taking into account a measure of a similarity of the extracted pages when computing the rank.

13. The method of claim 12, the method further comprising:
calculating the test score for a test taking user based on a test taken for a particular topic;
computing the confidence score for each annotation by distributing the test score among each annotation imported by the test taking user; and
changing the rank of the expert student who authored each annotation based at least in part on the confidence score.

14. The method of claim 13, wherein the confidence score for each annotation increases as users who import the annotation score higher on tests than previous users who imported the annotation.

15. A system comprising:
at least one processor; and
at least one non-transitory computer readable medium storing instructions that, when executed by the at least one processor, cause the system to generate ordered user expert lists for a shared digital document by performing steps comprising:
accessing a digital document, wherein the digital document relates to one or more topics;
generating a list of expert students, wherein the expert students have authored one or more annotations relating to a topic similar to the one or more topics in the digital document;
extracting one or more keywords of the digital document;
determining similar documents to the digital document based on presence of the keywords in the similar documents, wherein the similar documents also comprise one or more digital documents;
extracting pages of relevant documents from the similar documents, the relevant documents being those documents annotated by one or more of the expert students, wherein context of the extracted page is similar to context of a page in the digital document;
ordering the list of expert students according to a rank, wherein the rank is based on a measure of a similarity of the extracted pages and the rank identifies a level of expertise of the expert students; and
presenting the ordered list of expert students, where the ordered list comprises a pre-defined number of expert students with a level of expertise meeting a predefined threshold.

16. The system of claim 15, further comprising instructions that, when executed by the at least one processor, cause the system to performing steps comprising:
regenerating the ordered list of expert students as a new topic in the digital document is viewed, wherein the ordered list is based on an identified context of the new topic.

17. The system of claim 15,
wherein generating the list of expert students comprises:
extracting similar documents from a database of digital documents;
filtering the similar documents into a set of documents that one or more users have annotated;
computing a confidence score for each annotation imported by the user; and
computing a local user rank of each expert student based on the confidence score; and
further comprising instructions that, when executed by the at least one processor, cause the system to order the list of expert students based on the computed local user rank.

18. The system of claim 15, further comprising instructions that, when executed by the at least one processor, cause the system to perform steps comprising:
computing a confidence score for each annotation imported by a user accessing the digital document, wherein the confidence score is based on a test score of one or more users who imported the annotation, the test score being an indication of a quality of the annotation;

re-computing the rank based on the confidence score for each annotation by the user relating to the similar topic; and changing the order of the expert students presented in the ordered list based on the re-computed rank.

19. The system of claim 15, further comprising instructions that, when executed by the at least one processor, cause the system to perform steps comprising:

detecting user access to a second portion of the digital document, wherein the second portion of the digital document relates to a second topic; and generating a second ordered list of expert students based on the user access to the second portion of the digital document related to the second topic.

20. The system of claim 15, further comprising instructions that, when executed by the at least one processor, cause the system to perform steps comprising:

calculating a test score for a test taking user based on a test taken for a particular topic;

computing a confidence score for each annotation by distributing the score of the test among each annotation imported by the test taking user; and changing the rank of the expert student who authored each annotation based at least in part on the confidence score.

* * * * *